United States Patent [19]
Andersson et al.

[11] 3,878,311
[45] Apr. 15, 1975

[54] CHANNEL-TYPE ELECTRIC INDUCTION HEATING FURNACE

[75] Inventors: Conny Andersson, Viken; Bengt Fredriksson, Vasteras, both of Sweden

[73] Assignee: Allmanna Svenska Elektriska Aktiebolaget, Vasteras, Sweden

[22] Filed: Jan. 21, 1974

[21] Appl. No.: 434,888

[30] Foreign Application Priority Data
Jan. 26, 1973 Sweden............................. 73010829

[52] U.S. Cl. .................................................. 13/29
[51] Int. Cl. ............................................. H05b 5/14
[58] Field of Search ......................................... 13/29

[56] References Cited
UNITED STATES PATENTS
1,596,582  8/1926  Coe......................................... 13/29
2,385,983  10/1945  Hanes................................. 13/29 X

*Primary Examiner*—R. N. Envall, Jr.
*Attorney, Agent, or Firm*—Kenyon & Kenyon Reilly Carr & Chapin

[57] ABSTRACT

A channel-type electric induction heating furnace inductor unit for melting metal, has a metal frame which includes metal side walls having core clearance openings through which a transformer core surrounded by an induction coil extends, the frame supporting refractory forming a channel vertically looping around this core and coil, other core clearance openings being formed through the two walls and the balance of the core extending downwardly outside of these walls and through these other openings to form a closed magnetic flux circuit. Each wall has a gap or slot formed in it and which extends from one opening to the other, the portions of the walls below the core being structurally united or made integral. Since all of the portions of the walls are outside of the core, the formation of eddy currents in the latter are reduced or eliminated. The core is made as two separable parts with one part carrying the induction coil being separable from the furnace and the other core part and the latter comprising a structural part of the frame providing support for the latter.

8 Claims, 6 Drawing Figures

CHANNEL-TYPE ELECTRIC INDUCTION HEATING FURNACE

BACKGROUND OF THE INVENTION

This invention relates to the channel-type of electric induction heating furnaces used to heat and melt metal, and more particularly, to such furnaces of the core type.

Such a furnace uses an inductor unit which conventionally has a metal frame having oppositely interspaced upstanding walls in which mutually registered transformer core clearance openings are formed. A transformer core has an upper horizontal portion extending transversely through these walls via these clearance openings. The frame internally supports or contains refractory forming a metal heating channel forming a loop around this transformer core portion and extending upwardly and around above it to form a closed loop.

For maximum efficiency the core has vertical portions extending downwardly from the upper portion on the outsides of these upstanding frame walls and a lower horizontal portion below the channel and extending transversely between the lower ends of these vertical core portions. All of the portions magnetically interconnect to form a closed magnetic flux path, an electrically powered inductor coil surrounding the core's upper horizontal portion inside of the channel loop.

In operation, the inductor coil functions as a transformer primary coil and the metal melt in the channel loop forms the secondary coil in which electric currents are induced to heat the metal. At its upper portion the channel can be opened to a refractory lined container connecting with and mounted above the furnace inductor unit for containing solid metal before melting and molten metal before pouring. Ordinarily the furnace inductor unit and container are mounted so they can be turned over for pouring a finished melt from the container.

Customarily the core is built to form a generally rectangular loop with its upper horizontal position carrying the coil extending through the wall and its lower horizontal portion looping under the walls. To build the furnace inductor unit, each wall has been made as two halves assembled around the upper horizontal portion of the transformer core and welded together. Thus, the two halves are electrically interconnected, and to prevent the formation of intolerably large induced electric currents in these walls, they are formed with gaps extending radially from the transformer core clearance openings to their outer edges and interconnected by electrical insulation. This expedient, in turn, requires that all water coolant pipes or passages which loop around the upper horizontal core portion be electrically interrupted by electrical insulating connections. In turn, the entire construction of the frame is made complicated by the need to reinforce it so that it can adequately contain the refractory it supports and which defines the channel loop which contains the metal to be heated and melted.

It is to be understood that the foregoing has reference to the type of induction furnace unit having a vertical channel loop as contrasted to those having a horizontal channel loop, such as characterized by a Kjellin furnace.

In addition to the above disadvantages, repair and replacement of the refractory forming the channel is complicated since this refractory must surround the horizontal core portion carrying the coil, these being parts which are built into the furnace unit in a nonremovable manner.

Plainly, an improvement on such furnaces inductor units is desirable.

SUMMARY OF THE INVENTION

An object of the present invention is to provide such an improvement, particularly in the direction of providing a strengthened and better supported frame, eliminating the need for making the frame walls with the electrical interruption requiring mechanical connection of the interrupted parts by electrical insulation with its attendant structural weakness, eliminating the need for electrical interruptions in the water-cooling pipes or the need to resort to forced air cooling which is sometimes done, and in general, to make a better furnace of the type described.

The present invention provides this improvement by providing the frame's upstanding metal walls with a lower set of mutually registered core clearance openings through which the core's lower horizontal portion extends with the portions of these walls below this portion being structurally integral and forming a closed electric circuit around the outside of the core. In addition, the frame's walls have gaps or slots formed in them and which extend between the core openings, these requiring no structural interconnection by electrical insulation because of the core portions below the entire core.

Further, the upper horizontal core portion carrying the induction coil and one of the vertical portions of the core are made integral with each other but entirely separable or removable and replaceable from the furnace inductor unit. Thus, the core is made as two separable, parts, the remaining part being built into the frame construction so as to structurally reinforce and support the latter. This part forming part of the frame is a permanent furnace construction.

The two core parts are formed with closely abutting mating portions so that there is, for practical purposes, no interruption in the magnetic flux circuit when the separable part is installed and the furnace is in operation.

The horizontal core portion of the separable core part carries not only the inductor coil but also a water-cooled jacket which surrounds this coil, providing not only cooling but also mechanical protection for the coil during removal and replacement of this separable part. The coil and water-cooled jacket, for protectively cooling the coil, are structurally combined by suitable wrappings or the like with the horizontal portion of the separable core part and with the vertical portion of this part secured to the furnace unit, this horizontally extending assembly may be supported in cantilever fashion by the vertical part. The arrangement may be such that the water-cooling jacket's outside is spaced slightly from the core passage which is, of course, formed through the refractory, extending between the core clearance openings.

Both core parts may be made with their vertical and horizontal portions integrally interconnected and formed by laminations of transformer steel.

The frame is an open-topped shell and it is preferably made with its inside having a draft or upwardly outwardly angling surface so that when the separable core part is removed, the entire frame can be inverted by adequate tilting or rotation, the result being that the refractory can fall from the frame without the usual removal difficulties. This is done when necessary to repair or replace the refractory forming the melt channel.

The top of the frame is made with a flange so that the container for the metal can be fastened to the furnace unit. This flange extends from the top edge of the frame and its overhang is supported and reinforced by a metal wall angling downwardly from an outer peripheral portion of the bottom side of the flange to an adjacent portion of all of the upstanding walls of the frame, thus forming a duct peripherally surrounding the upper part of the frame directly below the flange and open to the bottom of the latter. The walls forming the core clearance openings have hollow metal flanges welded to them which open into this peripherally surrounding duct and extend downwardly therefrom to lower ends having respective inlet and outlet water-coolant openings, these flanges being welded to the frame walls and to the angular wall beneath the furnace's top attachment flange. In this way these walls are greatly strengthened and rigidified and cooled while an extensive water-cooling loop is provided for the furnace unit which is entirely free from the need for electrical interruptions and electrically insulating connections. The other frame walls which are free from the openings may be cooled and reinforced by pipe loops which extend downwardly from the upper peripheral duct and are welded to these walls.

The wall portions which extend below the bottom of the core may be conveniently used as supporting legs or as base members for the entire furnace if desired.

BRIEF DESCRIPTION OF THE DRAWINGS

The invention is schematically illustrated by the accompanying drawings, the various views not being to scale with each other but being intended as simplified illustrations avoiding possible confusion by the inclusion of parts within the designing ability of persons skilled in the art. In these drawings the various views are as follows.

DETAILED DESCRIPTION OF THE INVENTION

Figure 1:
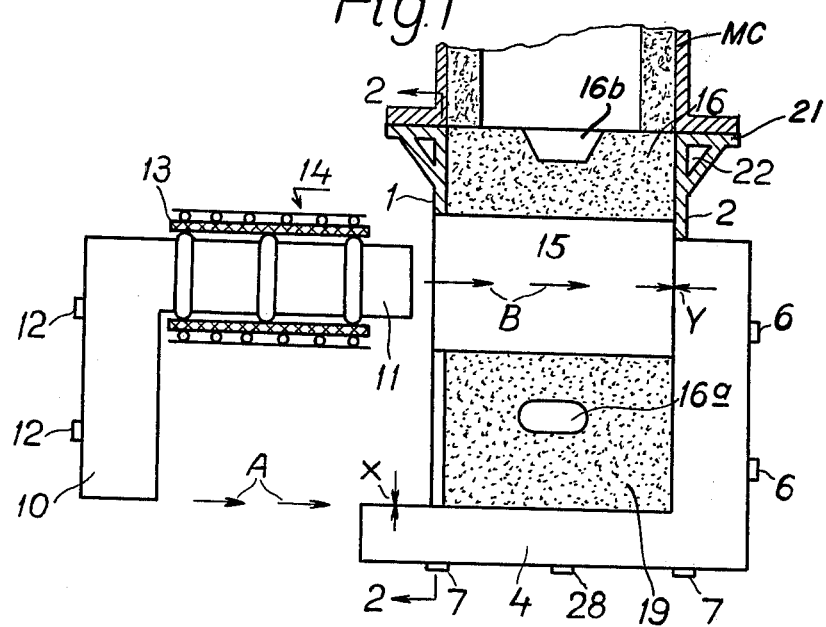
FIG. 1 represents a vertical cross section showing the separable part in its separated position.
Figure 5:
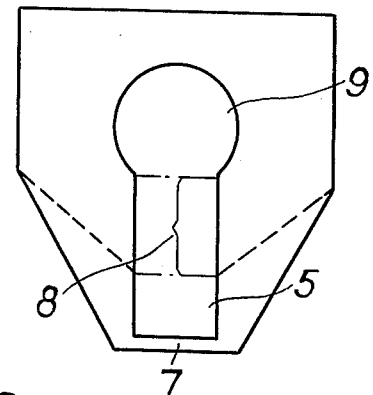
FIG. 5 is a side view showing the upper and lower core clearance openings of the present invention and with the gap that extends between these openings.

Having reference to the above drawings, FIG. 1 shows the front wall 1 and the back wall 2 of the frame with the fixed part of the transformer core having its vertical leg 3 extending upwardly as part of this frame and its horizontal leg 4 extending through the lower core clearance opening formed in the lower portions of the two walls 1 and 2 and which can be seen at 5 in FIG. 5. This core part 3–4 is an integral part of the frame, being built as part of the latter by the use of welding. Permanent connections between this core part and the balance of the frame construction are indicated at 6 in FIG. 1.

Figure 3:
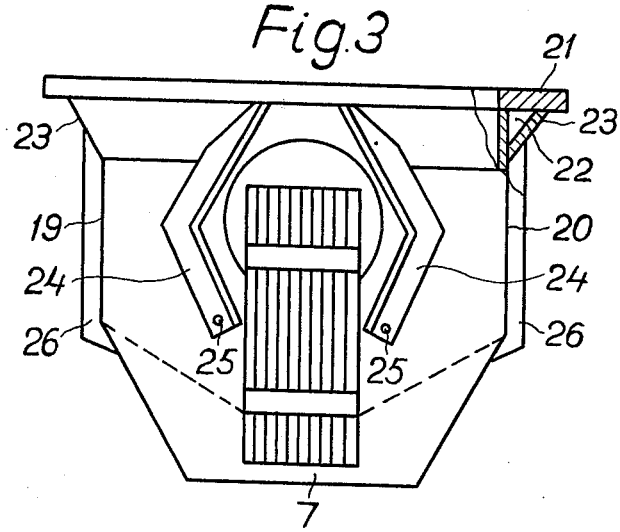
FIG. 3 is a side view showing the replaceable part in operating position in the furnace.
Figure 6:
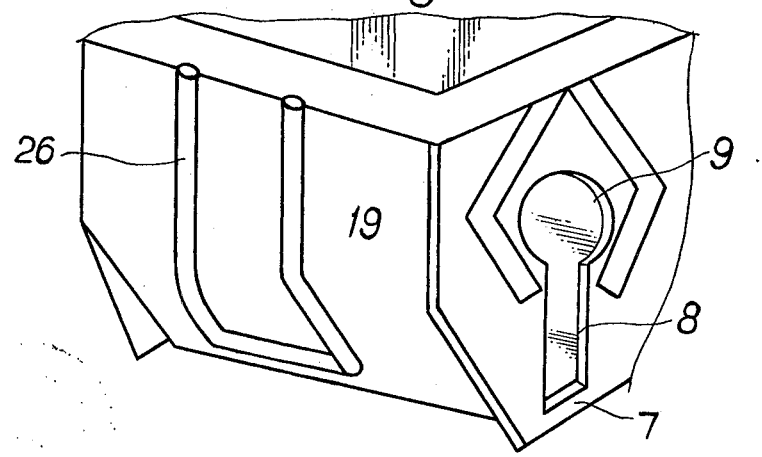
FIG. 6 is a simulated perspective view of the new furnace unit with the separable part removed.

FIGS. 3, 5, and 6 all serve to show how the front wall 1 has an integral portion 7 beneath the lower core clearance opening 5, the wall 2 having the same construction. All of the parts, excepting the refractory, are made of metal and the portions 7 of the walls 1 and 2 form closed electrical circuits, but these are around the entire core as previously explained.

FIGS. 5 and 6 show the gap 8 which extends from the lower core clearance opening 5 upwardly to the upper core clearance opening 9. Thus, without introducing a structural weakness, the only electrical circuit involved, as to each of the two walls, is that formed completely around the outside of the core, thus avoiding the introduction of eddy currents in these end walls which are of any substantial magnitude.

The other or separable core part, again referring to FIG. 1, is shown removed from the furnace unit, with its vertical leg 10 integrally joining with its horizontal leg 11, the latter forming the horizontal portion removably insertable through the core clearance opening 9. The end surfaces of the core portions 10 and 11 are flat, and when this separable part is installed in the furnace unit, these flat end surfaces abut flat side surfaces of the portions 3 and 4 of the permanent part of the core, the direction of insertion of the separable part being indicated by the arrows A and B, the various flat surfaces abutting as indicated by the arrows at X and Y. For fastening the separable part to the furnace unit, releasable interconnecting members are indicated at 12.

The horizontal leg or portion 11 of the separable part carries the electric induction coil 13 protectively surrounded by the water-cooled jacket 14, these parts being suitable structurally connected with the horizontal leg 11 and being carried by the latter when the separable part is removed from the furnace unit. This jacket 14, in addition to protectively cooling the coil 13, serves as mechanical protection for the latter during insertion and removal of the leg 11 through the access opening 9. When the separable part is joined with the permanent part of the furnace unit, with the vertical leg or portion 10 secured to the frame's wall 1, the leg 11 in cantilever fashion supports the coil and water jacket with the outside of the latter spaced slightly from the inside of the core passage 15 formed in the refractory 16 contained and supported by the frame. This refractory is cored to not only provide the passage 15, but also, of course, to provide the channel 16a having the open top 16b and which loops around the horizontal leg or portion 11 of the separable part when the latter is installed. This channel loop, of course, extends above the lower horizontal leg 4 of the permanent core but which is part of the frame.

Figure 2:
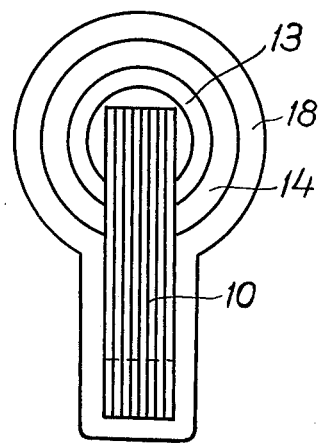
FIG. 2 is a front view showing a detail concerning the core clearance openings for the two horizontal core portions.

FIG. 2, which is a portion of a view such as might be taken along the line 2—2 in FIG. 1, shows a magnetic leakage flux ring 18 surrounding both core clearance openings and the gap 8 of the wall 1, and a corresponding arrangement may possibly be applied in the case of the frame wall 2.

The walls 1 and 2 may be considered to be the front and back walls of the frame, the side walls being indicated at 19 and 20 in FIG. 3 and the side wall 19 being clearly shown in FIG. 6, the other side wall being substantially the same.

When the refractory 16 must be removed for replacement or repair, the separable part of the core assembly is removed and the frame, including the permanent part of the core, is simply inverted. As previously noted, the inside surfaces of the frame walls are shaped with adequate draft or upward and outward angularity to cause the refractory body to be free to fall upon such inversion.

Figure 4:
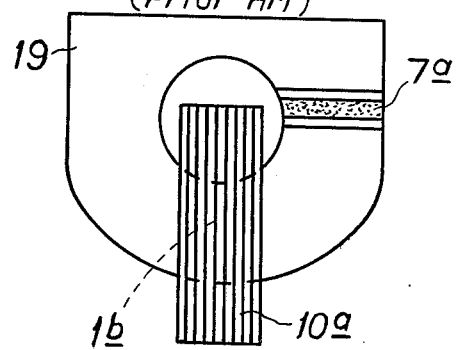
FIG. 4 generally corresponds to FIG. 3 but illustrates the prior art furnace inducton unit with its necessary electrical interruption and the electrical insulating joint thus made necessary.

At this point it can be seen that without weakening by the effect of electrical insulation mechanical interconnections, both end walls of the frame have the strength of solid metal interconnections, both metal end walls being integral throughout although possibly formed as parts interjoined by welding. Neither wall can form an electrical circuit extending through the inside of the core. The difference between this and the prior art construction is emphasized by FIG. 4 where the prior art construction is shown with the old form of end wall 1a with its portion 1b extending directly through the core, of which only the vertical leg 10a is shown. Here it has been necessary to interrupt the electrical circuit by an electrical insulating mechanical joint 7a which could not possibly provide the mechanical strength of continuous metal.

FIG. 3, in particular, shows the peripheral flange 21 peripherally surrounding and integrally joining with the upper edges of the frame's walls the melt container MC is shown partially in FIG. 1, fixed to this flange 21. 22 indicates the peripheral cooling duct formed by the diagonal strutting reinforcing plates 23 which extend from the outer peripheral portions of the flange 21 to all of the upstanding wall of the frame, these parts being made of metal with the connections made by welding. At the corners of the frame these plates 23 are welded together so that the channel 22 extends peripherally along the entire top of the frame. The end walls of the frame have the hollow flanges, or webs, 24 welded to them with upper ends welded to and opening through the strutting plates 23 to give access to the cooling duct 22, the bottoms of these flanges 24 being provided respectively with cooling water passages 25 so that one may function as an inlet and the other an outlet, providing for a circulation of cooling water.

Although not shown, the duct 22 may have an internal partition between the openings of the flanges 24. It can be seen that these hollow flanges not only provide cooling water passages entirely outside of the core, but also which, in addition, function to reinforce the end walls 1 and 2, the flanges being applicable to both walls. No electrically insulating connection need be interposed in the water cooling circuit. Additionally, downwardly extending U-shaped loops of pipes, indicated at 26 in FIG. 6, may be extended from connections with the peripheral ducts 22 down the side walls and close to their bottoms, as indicated at 26 in FIG. 6 particularly, although also shown at 26 in FIG. 3. These pipes may have strong walls and be welded to the side walls, and, of course, suitable partitions should be arranged in the duct 22 as required to effect a water circulation through these pipes 26.

It follows from the above that all of the walls of the frame are reinforced, the front and back walls 1 and 2 by the hollow water-cooling flanges 24 and the side walls by the cooling pipes 26, all of these reinforcing elements extending downwardly along the frame walls to the extents required for their reinforcing.

The portions 7 of the end walls 1 and 2 are shown, particularly by FIG. 3, as extending well below the bottom wall 27 of the frame and these portions 7 function as legs or base members for carrying the weight of the furnace. In addition, the side wall 19 is shown in FIG. 6 as having an intermediate supporting leg 28 welded to it to function as a short reinforcing flange as well. The other wall may be correspondingly provided with such an arrangement.

When in operation, no part of the metal frame can form a closed circuit extending inside of the core so the metal parts do not consume electric current during operation of the furnace. Because the coil and water jacket can be assembled on the separable part while it is removed from the furnace unit, these elements can be constructed in a simplified manner and more compactly than usual to provide for better coupling between the primary and secondary circuits of the furnace. Also, this permits the entire furnace unit to be designed more compactly than usual and to take up less space; the entire frame which in this invention includes the permanent part of the core, is self-supporting. All of the water-cooling ducts are formed by parts integrally joined to and reinforcing the frame and comprising parts thereof.

What is claimed is:

1. A channel-type electric induction heating furnace inductor unit comprising a frame having oppositely interspaced upstanding metal walls in which mutually registered transformer core clearance openings are formed, a transformer core having an upper horizontal portion extending transversely through said walls via said openings, said upper horizontal portion having opposite ends projecting outwardly from said walls, said frame supporting refractory between said walls and this refractory forming a metal heating channel loop around said upper horizontal portion of said core and extending upwardly therefrom, said core having a vertical portion extending downwardly from each of said opposite ends of said upper portion on the outsides of said walls and a lower horizontal portion below said channel and extending transversely between the lower ends of said vertical portions, said core portions magnetically interconnecting and said core forming a substantially closed magnetic flux path, and an electrically powered inductor coil surrounding said upper horizontal portion of said core; wherein the improvement comprises said upstanding metal walls of said frame having mutually registered lower core clearance openings formed therein above the bottoms of said walls and through which said lower horizontal portion of said core extends, said walls having portions below said lower core clearance openings and which are electrically interconnected and form a closed electrical circuit around the outside of siad core; said upstanding metal walls each having a gap formed therein in each instance extending completely between and joining with said core clearance openings.

2. The unit of claim 1 in which said upper horizontal core portion and one of said vertical core portions are structurally interconnected and form a part separable from said unit.

3. The unit of claim 2 in which said coil is structurally attached to and supported by the horizontal core portion of said separable part.

4. The unit of claim 1 in which said frame has an open top and upstanding walls completely laterally enclosing and supporting said refractory, a flange connected to and peripherally surrounding said open top, and strut walls connected to and extending from a peripheral portion of the bottom of said flange to and connected with said upstanding walls and defining a reinforcement for said flange and the adjacent portions of said walls and also a cooling water duct peripherally surrounding the upper portions of said walls.

5. The unit of claim 4 in which hollow structurally strong members extend from said strut plates down at least some of said upstanding walls and are structurally connected therewith as reinforcing elements, said members internally connecting with said duct for the passage of cooling water therethrough to and from said duct.

6. The unit of claim 2 in which said lower horizontal core portion and the other of said vertical core portions are structurally connected with said frame and form a supporting part thereof.

7. The unit of claim 2 in which said frame has a draft permitting substantially free removal of said refractory when said separable parts is separated from the furnace.

8. The unit of claim 1 in which said wall portions below said lower horizontal portion of said core are integrally structurally joined together in each instance below said lower core clearance openings.

* * * * *